UNITED STATES PATENT OFFICE.

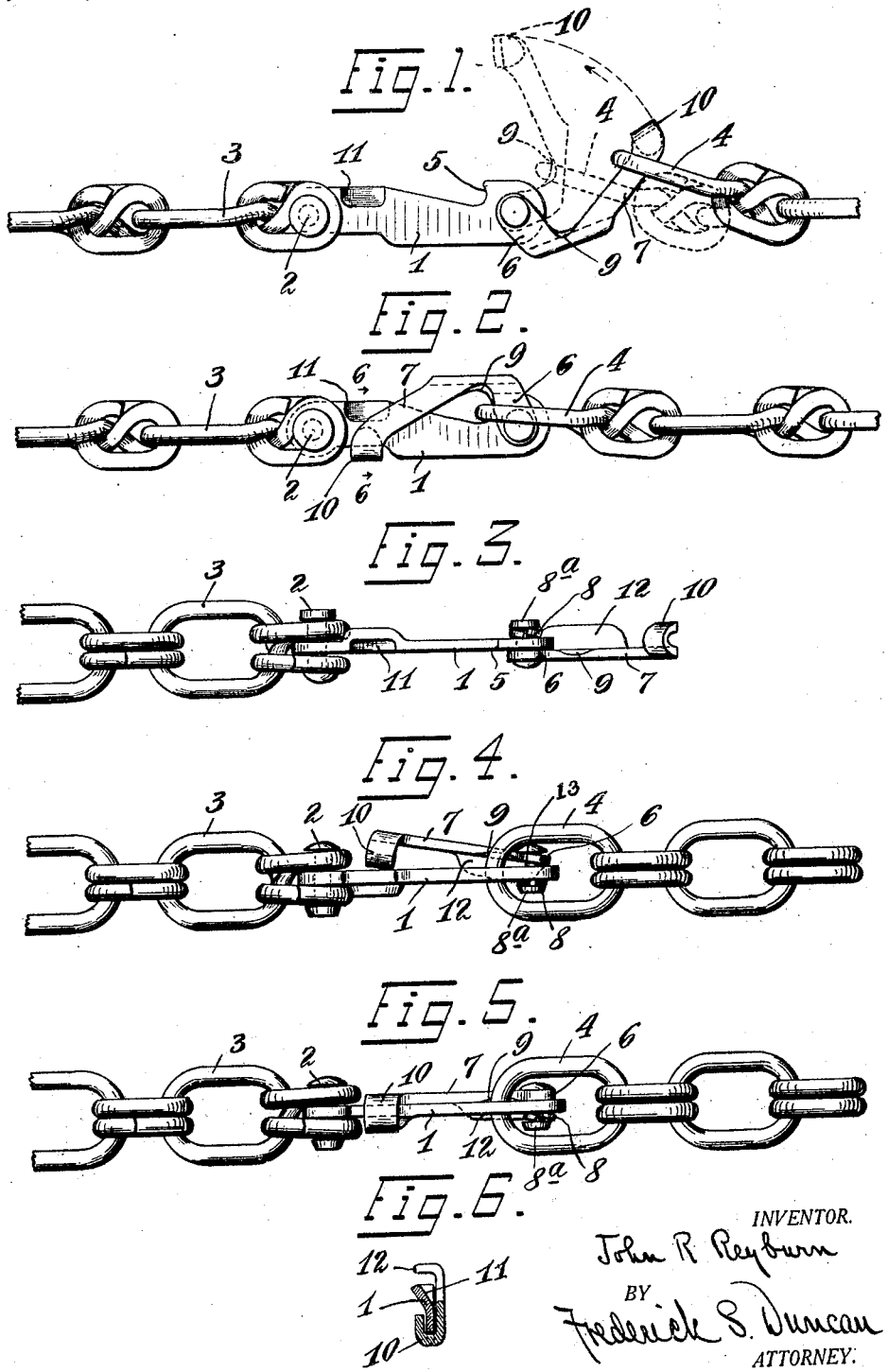

JOHN R. REYBURN, OF FAIRFIELD, CONNECTICUT, ASSIGNOR TO AMERICAN CHAIN CO., INC., A CORPORATION OF NEW YORK.

CONNECTING AND TIGHTENING DEVICE.

1,404,319.  Specification of Letters Patent.  Patented Jan. 24, 1922.

Application filed February 17, 1920. Serial No. 359,452.

*To all whom it may concern:*

Be it known that I, JOHN R. REYBURN, a citizen of the United States, residing at Fairfield, in the county of Fairfield, State of Connecticut, have invented certain new and useful Improvements in Connecting and Tightening Devices, of which the following, taken in connection with the accompanying drawing, is a specification.

One object of my invention is the construction of a connecting and tightening device for side chains of anti-skid devices for vehicle wheels that will offer a high degree of resistance to being accidentally unlocked or disconnected.

Another object is the construction of such a device in which the tightening operation will be characterized by a leverage action.

Another object is the construction of such a device characterized as above described in which substantially all of the stress created by the two connecting ends of chain when the device is locked shall be borne by a single rigid member.

Referring to the drawings, Figure 1 is a side view of my device showing the parts in unlocked position in connection with the two chain ends.

Figure 2 is a side view showing the parts in locked position.

Figure 3 is a top view showing the parts in the position shown in Figure 1, with chain end 4 omitted.

Figure 4 is a bottom view showing the locking lever in the position which it occupies just previous to engagement with the tension member.

Figure 5 is a bottom view of the device showing the parts in the position shown in Figure 2.

Figure 6 is a detailed view in cross-section on the line 6—6 of Figure 2.

Broadly stated, the device is intended for use under any conditions in which it is desired to draw toward each other and connect two sections of chain, wire or the like, where the resistance is such that direct manual pull would ordinarily be insufficient to produce the desired tightening effect; and under conditions in which the device is subjected to violent jactation, but in which, nevertheless, adaptability for frequent and easy connection and disconnection is desirable. All of these conditions exist to a pronounced degree in the case of those types of anti-skid devices for vehicle wheels which involve the use of one or more flexible circular members arranged concentric with the wheel and I therefore show and describe my device in a form adapted to serve the purpose above described in connection with such a use. The part designed to bear the tensional stress of the chains when the device is in locked position and which may be termed the tension member, comprises a bar 1, which is provided at one end with means such as the cross-bar 2, for engagement with a chain link. This engagement is preferably made so that it will not be accidentally detachable when the device is used in connection with anti-skid devices. For connection with a link of the opposite chain end 4, the tension member is provided with a shoulder 5, which, as shown, faces in the direction of the non-detachable connection and is preferably canted slightly in the same direction.

The shoulder may, if desired, be slightly curved inwardly as shown, thus forming what is virtually a hook of a large radius.

By canting the shoulder as above described, a chain link in engagement therewith will tend to seat itself against it, and the tendency to work off or be thrown off is lessened to an extent having a direct relation to the degree of cant. In describing and showing the shoulder as canted as above described, I intend to be understood as describing a preferable construction only.

The means for bringing the chain ends toward each other and for carrying the free chain end into engagement with the shoulder and for locking it against accidental displacement consists of an angle lever pivotally connected with the end of the tension member by any convenient means such as the rivet 13, and comprising the short section 6 and long section 7. Resilient means are preferably provided, normally to maintain the lever against the tension member, in other words, to maintain the lever and tension member in such relation to each other that they may normally oscillate in parallel planes. These means may consist, for example, in making the rivet on which they are pivoted, longer than the combined thickness of the tension member and lever, and interposing a stiff helical spring 8 between the tension member and opposite end 8ª, of the rivet 13.

As one of the purposes of the lever is to carry the end link of the free chain end into engagement with the shoulder, it is desirable that during the operation of swinging the lever as hereinafter further described, the end link in engagement therewith, as shown in Figure 1, be prevented from slipping thereon so far in the direction of the fulcrum of the lever that the link would not be seated against the shoulder. This purpose may be served by a recess 9 formed by the angle of the lever, the recess being a sufficient distance from the center of oscillation of the lever to permit the link to clear the tip of the shoulder as the lever is swung to the closed or locked position shown in Figure 2. To retain the lever in locked position I provide it with means such as the hook 10, adapted to engage that edge of the tension member which is opposite to the edge on which the shoulder is located.

As the lever is swung to locked position, the base of the hook would normally abut against the edge of the tension member, but as the connection of the lever with the tension member is resilient to allow of some sidewise movement, it may be swung slightly sidewise to permit it to clear the upper edge of the tension member. The latter operation may be facilitated if a section of the edge of the tension member in the path of the hook be bevelled on the side on which the lever is located as indicated at 11. As the tip of the hook clears the lower edge of the tension member in the process of locking, the spring 8 will cause the lever to take a position adjacent the tension member. If desired, the short arm of the lever may be so shaped that in locked position, it will, as indicated in Figure 2, take a part of the stress of the chain link 4 which will tend to keep the hook in close engagement with the lower edge of the tension member, and thus provide a positive stop to sidewise movement of the lever. A thumb plate 12 to facilitate easy manipulation of the lever may be provided, if desired.

The operation of my device is as follows: The sections to be connected are drawn by direct pull or otherwise sufficiently close together to permit the insertion of the lever in the eye of the end link of the free chain end, whereupon the parts occupy the relative position shown by the full lines of Figure 1. The lever is then swung toward its locked position as shown in Figure 2. As it moves toward the position shown by the dotted lines in Figure 1, the engaged link slides along the long section, until it seats itself in the recess of the lever, which position it reaches when the lever is approximately in the position indicated by the dotted lines in Figure 1. The motion of the lever is continued to locked position after the last named position has been reached, thus carrying the link into engagement with the shoulder.

Having thus described my invention and with the understanding that changes, variations and modifications can be resorted to which come within the scope thereof, I claim:

1. A connecting and tightening device comprising a tension member and a locking lever pivotally connected to each other end to end, said tension member being provided with a shoulder canting at a relatively small angle in a direction opposite the point of pivotal connection, and said lever being provided with a recess intermediate its ends, and at a distance from said pivotal connection slightly greater than the distance of said shoulder therefrom.

2. A connecting and tightening device comprising a tension member provided with a shoulder intermediate its ends, and a locking lever pivotally connected to said tension member, said locking lever being provided with a recess intermediate its ends, the said recess being further from the point of pivotal connection than is said shoulder, and said lever being also provided with a hook adapted to engage an edge of said tension member when the said locking lever is in locked position.

3. A connecting and tightening device comprising a tension member provided with a shoulder intermediate its ends, and a locking lever pivotally connected to said tension member, said locking lever being provided with a recess intermediate its ends, the said recess being further from the point of pivotal connection than is said shoulder, and said lever being also provided with a hook adapted to engage an edge of said tension member when the said locking lever is in locked position, and resilient means for normally retaining said lever in the same plane of oscillation relative to said tension member.

4. A connecting and tightening device comprising a tension member provided with a shoulder intermediate its ends, and a locking lever pivotally connected to said tension member, said locking lever being provided with a recess intermediate its ends, the said recess being further from the point of pivotal connection than is said shoulder, and said lever being also provided with a hook adapted to engage an edge of said tension member when the said locking lever is in locked position, and resilient means for normally retaining said lever in the same plane of oscillation relative to said tension member, said resilient means comprising a helical spring.

5. A connecting and tightening device comprising a tension member and a locking lever pivotally connected to each other, end to end, said locking lever being provided with means for engagement with said tension member and resilient means for normally maintaining said locking lever in the same plane of oscillation relative to said tension member.

6. A connecting and tightening device comprising a tension member and a locking lever pivotally connected to each other, end to end, and resilient means for normally maintaining said locking lever in the same plane of oscillation relative to said tension member, said resilient means comprising a helical spring, and said locking lever being provided with means for locking the same to said tension member.

7. A connecting and tightening device comprising a tension member and a locking lever pivotally connected to each other end to end, said locking lever being provided with means for engagement with said tension member, and said pivotal connection being established by means of a rivet of a length greater than the combined thickness of said lever and tension member, and resilient means for normally maintaining said lever in the same plane of oscillation relative to said tension member.

8. A connecting and tightening device comprising a tension member and a locking lever pivotally connected to each other end to end, said locking lever being provided with means for engagement with said tension member, and said pivotal connection being established by means of a rivet of a length greater than the combined thickness of said lever and tension member, and resilient means for normally maintaining said lever in the same plane of oscillation relative to said tension member, said resilient means consisting of a helical spring on said rivet interposed between the head thereof and either said lever or said tension member.

9. A connecting and tightening device comprising a tension member and a locking lever pivoted thereto, and provided with a hook adapted to engage said tension member when the parts are in locked position, and resilient means for normally maintaining said lever and said tension member in parallel planes.

10. A connecting and tightening device comprising a tension member and a locking lever pivoted thereto, and provided with a hook adapted to engage said tension member when the parts are in locked position, and resilient means for normally maintaining said lever and said tension member in parallel planes, said resilient means consisting of a spring mounted and adapted to press said lever and tension member together along the axis of said pivotal connection.

In testimony whereof, I have signed this specification.

JOHN R. REYBURN.